UNITED STATES PATENT OFFICE.

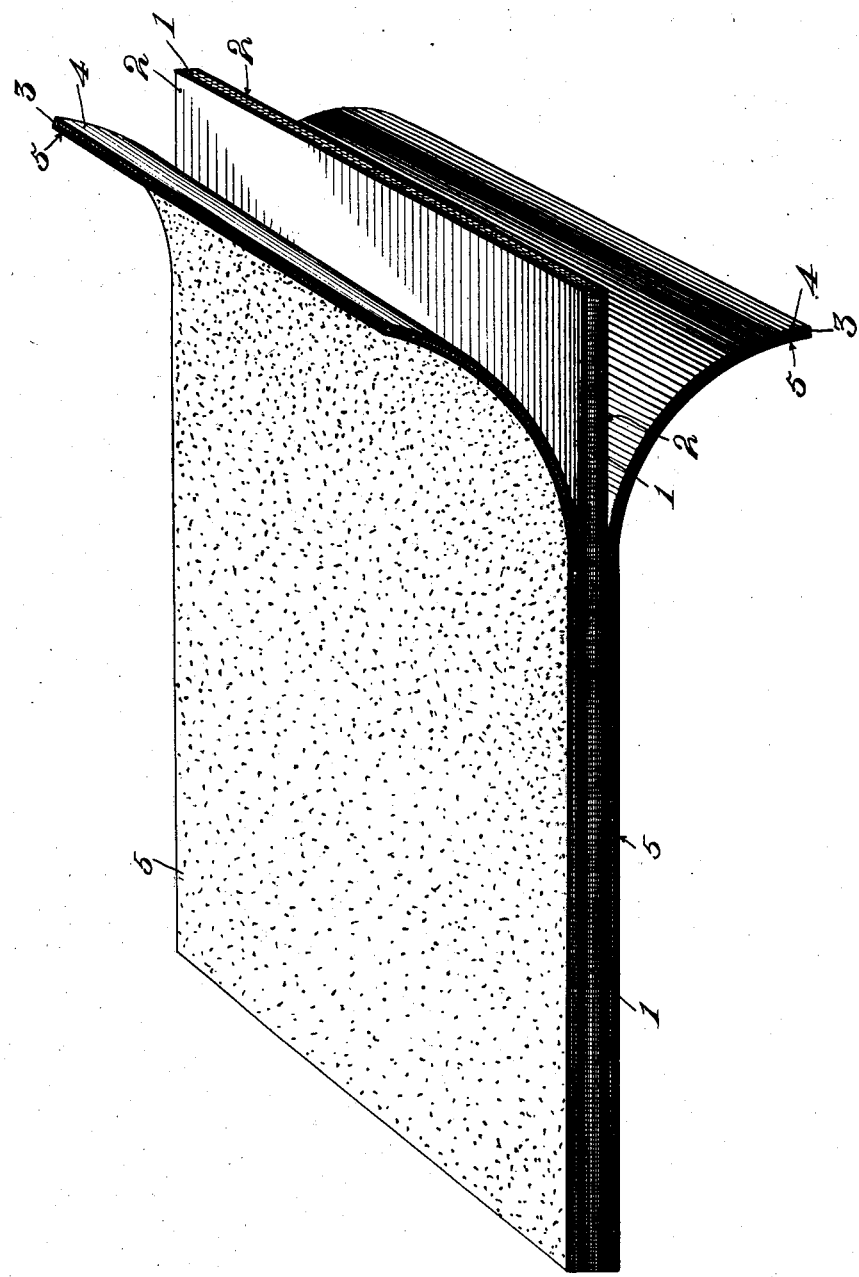

DUGALD SINCLAIR PATERSON, OF PHILADELPHIA, PENNSYLVANIA.

PACKING.

936,658. Specification of Letters Patent. Patented Oct. 12, 1909.

Application filed February 23, 1909. Serial No. 479,554.

*To all whom it may concern:*

Be it known that I, DUGALD SINCLAIR PATERSON, a citizen of the United States, residing in the city of Philadelphia, county of Philadelphia, and Commonwealth of Pennsylvania, have invented certain new and useful Improvements in Packings, of which the following is a full, clear, and exact specification.

My invention relates to certain new and useful improvements in insulating or heat-resistant packings, and is especially applicable to sheet packings, such as are used for many purposes in the arts and industries.

The object has been to produce a packing which will have not only great insulation and heat-resistant properties, but one which will be easily manipulated, cut, and fitted, and at the same time be tough and possess considerable tensile strength. It also consists in the method of manufacturing the same.

My invention will be clearly understood from the accompanying drawing, which is a sectional view of the finished packing.

As will be seen from the drawing, the packing is provided with a central body or base 1, consisting preferably of a sheet of asbestos cloth or other heat-resistant substance, and this base is provided upon both sides with a thin coating of rubber 2, 2, of such composition as will best withstand high temperature. Fabric cover-cloths which have previously been provided with a thin coating of a rubber composition 4, 4, are disposed upon each side of the base 1, their rubber side being adjacent the base, and the outsides of the cloths are coated with a graphite composition 5, 5, such as will render the completed structure highly resistant to heat.

The method of preparing the packing which I prefer to use is as follows: A sheet of asbestos is taken as a base and is coated on both sides with a thin coating of rubber. The cover-cloths are likewise covered upon one side with a similar coating of rubber, and the cloths placed upon each side of the asbestos base with the rubber sides down. The combined sheet is then subjected to hydraulic pressure between vulcanizing plates and thoroughly vulcanized together, and subsequently the graphite composition is spread upon the outer surface of the cover-cloths and thoroughly pressed into the pores thereof. This may be done by rollers, hydraulic presses, or any other suitable means.

The rubber composition employed in the manufacture of my packing may be any one of the well known formulas, such as is susceptible of vulcanization, and the graphite composition may comprise any suitable carrying medium capable of holding sufficient graphite in the mixture to produce the necessary heat-resistant attributes.

It is obvious that various unsubstantial changes may be made in the manufacture and constitution of my packing, and I do not mean to limit myself to the specific form shown and described, but

What I claim and desire to secure by Letters Patent is:

1. As a new article of manufacture, a water-resisting packing comprising a heat-insulating base, an adhesive coating upon said base, a fabric cover-cloth adjacent said base, provided with an adhesive coating upon its side next the base, and having its outer surface protected by a high-temperature-resistant composition.

2. As a new article of manufacture, a sheet packing comprising a central body or base of asbestos, a rubber coating upon said base, a fabric cover-cloth adjacent said base, having a rubber coating upon the side next thereto, and a coating of heat-resistant material upon the outside of said cloth.

3. As a new article of manufacture, a sheet packing comprising an asbestos base, a rubber coating upon each side of the same, a fabric cover-cloth upon each side of said base, having a rubber coating upon the side next said base, and having its outer surface provided with a graphite composition.

4. As a new article of manufacture, a sheet packing comprising a base of asbestos fabric, a rubber coating upon each side of the same, a pair of fabric cover-cloths secured to the two sides of the rubber-coated base, which cover-cloths are provided with a rubber coating on the side next said base, and upon the outside with a graphite composition to render them heat-resistant.

In testimony whereof, I have hereunto set my hand in the presence of two subscribing witnesses.

DUGALD SINCLAIR PATERSON.

Witnesses:
 H. CHAS. RAWLINS,
 ROBERT J. SUTHERLAND.